United States Patent

Shibata et al.

[11] Patent Number: 6,130,810
[45] Date of Patent: Oct. 10, 2000

[54] MAGNETIC RELUCTANCE EFFECT MAGNETIC HEAD WITH THE CONNECTION LENGTH OF THE FORWARD ELECTRODE LESS THAN THE FACING LENGTH OF THE MAGNETIC GAP

[75] Inventors: Takuji Shibata; Norio Saito, both of Miyagi; Yutaka Soda, Kanagawa, all of Japan

[73] Assignee: Sony Corporation, Tokyo, Japan

[21] Appl. No.: 08/231,513

[22] Filed: Apr. 22, 1994

[30] Foreign Application Priority Data

Apr. 23, 1993 [JP] Japan ..................................... 5-097476

[51] Int. Cl.$^7$ ....................................................... G11B 5/39
[52] U.S. Cl. ......................... 360/322; 360/318; 360/327
[58] Field of Search ................................... 360/113, 125, 360/126, 119, 120, 318, 322, 327

[56] References Cited

U.S. PATENT DOCUMENTS

| 4,967,298 | 10/1990 | Mowry | 360/113 |
| 4,987,509 | 1/1991 | Gill et al. | 360/113 |
| 5,218,497 | 6/1993 | Tanabe et al. | 360/113 |
| 5,247,413 | 9/1993 | Shibata et al. | 360/113 |
| 5,301,079 | 4/1994 | Cain et al. | 360/113 |
| 5,375,022 | 12/1994 | Gill et al. | 360/113 |

FOREIGN PATENT DOCUMENTS

| 0 457 278 | 11/1991 | European Pat. Off. |
| 0 477 941 | 4/1992 | European Pat. Off. |
| 5-40920 | 2/1993 | Japan |

OTHER PUBLICATIONS

"Process To Eliminate The Thin Gold From The Legs Of The Read Track On An Interleaved Tape Head With Deposited Magnetic Shield", IBM Technical Disclosure Bulletin, vol. 34, No. 9, Feb. 1, 1992.

Primary Examiner—Jefferson Evans
Attorney, Agent, or Firm—Hill & Simpson

[57] ABSTRACT

A magnetic reluctance effect magnetic head in which a forward side electrode is stacked on at least the surface of a magnetic reluctance effect element facing a magnetic recording medium, and in which an upper magnetic pole is stacked on the forward side electrode for facing the magnetic reluctance effect element. A connecting length L1 between the magnetic reluctance effect element and the forward side electrode is shorter than a facing length L2 over which the upper magnetic pole and the magnetic reluctance effect element face each other via a magnetic gap G. The upper magnetic pole and the magnetic reluctance effect element have an area in which the upper magnetic pole and the magnetic reluctance effect element face each other over a distance g2 larger than a magnetic gap length g1 of the magnetic gap G. The upper magnetic pole may be formed to be progressively spaced apart from the magnetic reluctance effect element by being angled 30° relative to the magnetic reluctance effect element, and the distance g2 may be progressively increased. With the magnetic reluctance effect magnetic head, the playback output may be improved and the magnetic head may be reduced in size and in the power consumption.

6 Claims, 11 Drawing Sheets

FIG.1

PRIOR ART

MAGNETIC RELUCTANCE EFFECT MAGNETIC HEAD WITH THE CONNECTION LENGTH OF THE FORWARD ELECTRODE LESS THAN THE FACING LENGTH OF THE MAGNETIC GAP

BACKGROUND OF THE INVENTION

This invention relates to a magnetic reluctance effect magnetic head and, more particularly, to an improvement in a connection structure of a forward side electrode.

Figure 1:
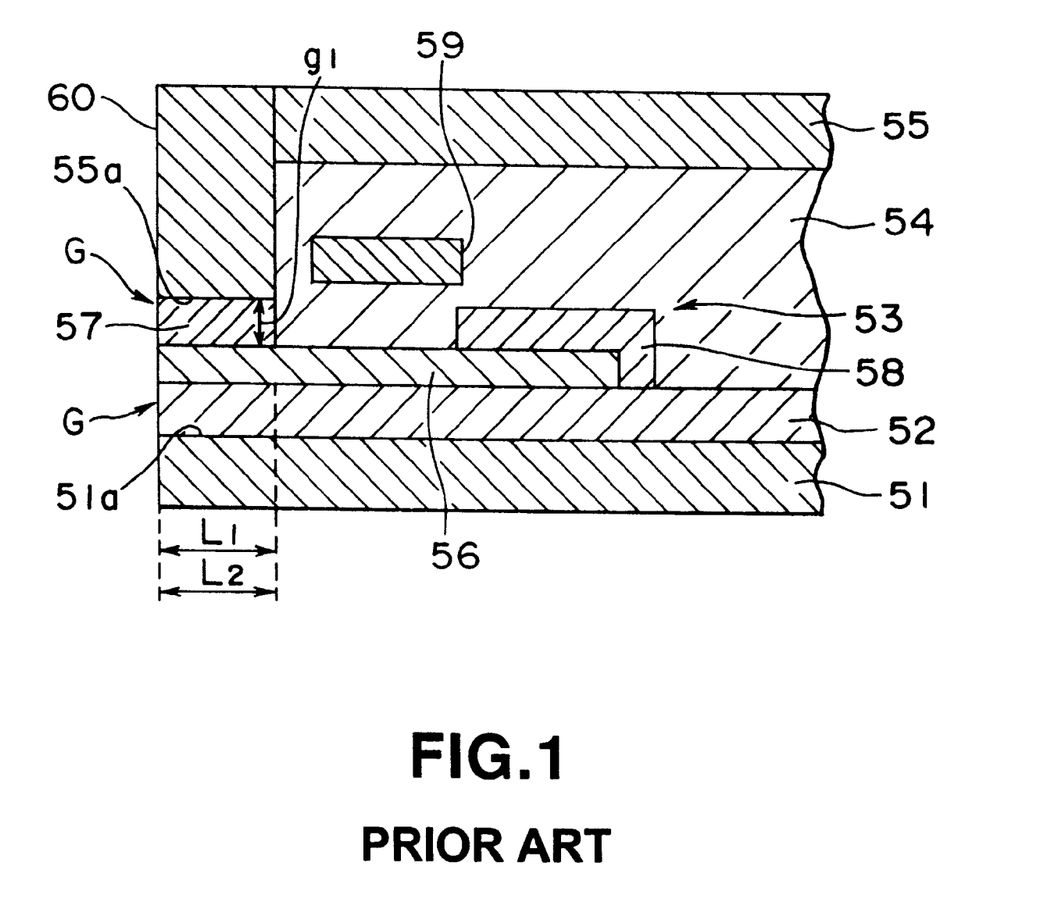
FIG. 1 is a cross-sectional view showing a conventional MR head.

A magnetic reluctance effect magnetic head employed in, for example, a playback magnetic head in, for example, a hard disc drive device, referred to herein as an MR head, comprises a lower magnetic pole 51 on which a magnetic sensitive area 53 is formed via a first insulating film 52 and an upper magnetic pole 55 formed on the magnetic sensitive area 53 via a second insulating film 54, as shown in FIG. 1. The magnetic sensitive area 53 is made up of a magnetic reluctance effect element 56, referred to herein as a MR element, having a forward side electrode 57 towards a surface 60 facing a magnetic recording medium and a rear electrode 58 on the opposite side, and a bias conductor 59 provided traversing the MR element 56 at right angles thereto for affording a bias magnetic field to the MR element 56 in a pre-set direction. A second insulating film 54 is interposed between the MR element 56 and the bias conductor 59.

With this type of the MR head, the upper magnetic pole 55 is thickened in the vicinity of the surface 60 facing the magnetic recording medium and the distance between the upper magnetic pole 55 and the lower magnetic pole 51 becomes narrow towards the surface 60 facing the magnetic recording medium. A terminal end portion 55a of the upper magnetic pole 55 and a terminal end portion 51a of the lower magnetic pole 51 face the MR element 56 via magnetic gap areas G each having a certain gap width. The terminal end portion 55a of the magnetic pole 55 is connected to a terminal electrode 57, with a connecting length L1 of the MR element 56 to a terminal electrode 57 directly being the depth of the magnetic gap. That is, the connecting length L1 of the MR element 56 with the terminal electrode 57 is set so as to be equal to the length L2 over which the terminal end portion 55a of the upper magnetic pole 55 faces the MR element 56 via the magnetic gap area G having a gap length g1.

For reproducing the information by the above-described MR head, the sense current is supplied to the MR element 56 from the forward side electrode 57 and the rear electrode 58, while a bias magnetic field is applied to the MR element 56 for magnetizing the MR element 56 in a pre-set direction. When the stray magnetic flux is supplied from the magnetic recording medium to the MR element 56, the direction of magnetization of the MR element is rotated due to the magnetic flux so that it has an angle related with the amount of the magnetic flux depending on the direction of the current flowing in the MR element 56. This causes the electrical resistance of the MR element 56 to be changed to produce voltage changes corresponding to the change in the electrical resistance across both terminals of the MR element. The information may be detected by detecting these voltage changes.

Although it is desired to improve the playback output with the above-described MR head, the playback output of the MR head is determined by the sensitivity of the MR element arranged in the magnetic sensitive area. Since the MR element is arranged in the MR head at right angles to the surface facing the magnetic recording medium, the closer a specified area of the MR element is to the surface facing the magnetic recording medium, the larger is the amount of the signal magnetic flux flowing into the MR element and hence the higher is the sensitivity of the specified area. However, the forward side electrode is provided on the surface of the MR element facing the magnetic recording medium, so that the portion of the MR element connected to the forward side electrode cannot be expected to exhibit the magnetic reluctance effects. Consequently, it has been desired to reduce the connecting length L1 between the MR element and the forward side electrode and to make use of the high sensitivity area in order to improve the sensitivity of the MR element and the playback output of the MR head.

On the other hand, it has also been desired to reduce the size and power consumption of the MR head device. If the connecting length L1 between the MR element and the terminal electrode is diminished to an excessively small value in order to improve the playback output as described above, the length L2 over which the upper magnetic pole and the MR element face each other with the magnetic gap area G therebetween is correspondingly diminished. However, if the facing length L2 is diminished, the bias current required for generating the optimum bias current is increased to render it difficult to realize the saving in power consumption.

Besides, in a hard disc device in which the MR head is used as playback means, plural hard discs are usually enclosed for increasing the recording capacity, so that plural MR heads are used in association with the hard discs. Since the same current may be used for these MR heads, the sense current is supplied via the same terminals to the MR heads. However, if the facing length L2 over which the upper magnetic pole and the MR element face each other via the magnetic gap area G is diminished, the dependency on the facing length L2 of the bias current required for generating the optimum bias magnetic field is increased, so that the amount of the required bias current becomes different due to the minute difference in the facing length L2. That is, it becomes impossible to supply the bias current for each of the MR heads via the same terminals. Consequently, different terminals for supplying the bias current are provided for the respective MR heads in the hard disc drive device, with the result that it becomes difficult to reduce the size of the device.

Also a part of the bias magnetic field generated by the bias conductor flows from the upper magnetic pole towards the lower magnetic pole so as to be applied to the MR element arranged between these poles. The portion of the MR element most strongly influenced by the bias magnetic field is the portion closer to the forward side electrode, that is the portion in which the upper magnetic pole is closest to the lower magnetic pole. It is in this region where magnetic saturation is most likely to occur. Consequently, with the conventional MR head, the portion of the MR element having the maximum sensitivity is not utilized so that the playback output is not optimum.

SUMMARY OF THE INVENTION

In view of the above-described status of the art, it is an object of the present invention to provide a magnetic reluctance effect magnetic head in which the area of the MR element having optimum sensitivity is used and in which the bias magnetic field is not saturated in such area for improving the playback output.

It is another object of the present invention to provide a magnetic reluctance effect magnetic head in which the number of terminals may be diminished to render it possible to achieve reduction in the size of the device and power consumption.

According to the present invention, there is provided a magnetic reluctance effect magnetic head in which a forward side electrode is stacked on at least the surface of the magnetic reluctance effect element facing a magnetic recording medium, and in which an upper magnetic field is stacked on the forward side electrode for facing the magnetic reluctance effect element, with a connecting length L1 between the magnetic reluctance effect element and the forward side electrode being selected to be shorter than a facing length L2 over which the upper magnetic pole and the magnetic reluctance effect element face each other via a magnetic gap G, so that the magnetic reluctance effect proper to the area of higher sensitivity of the magnetic reluctance effect element may be achieved and hence an optimum bias magnetic field may be produced with the small bias current.

According to the present invention, a facing length L3 over which the upper magnetic pole and the magnetic reluctance effect element face each other with a distance g2 larger than the gap length g1 of the magnetic gap G is set to $1 \ \mu m \leq L3 \leq 5 \ \mu m$, so that the distribution of the bias magnetic field in the magnetic reluctance effect element is changed and the position of saturation of the bias magnetic field is moved away from an area of optimum sensitivity of the magnetic reluctance element, thereby further improving the playback output. Also the dependency of the bias current on the facing length L2 as required for generating the optimum bias magnetic field may be diminished so that the bias current is not changed by the small difference in the facing length L2. Consequently, the bias current may be substantially constant despite the difference in the facing lengths L2 between the forward side electrodes and the magnetic reluctance effect elements of different MR head so that the number of the terminals may be diminished for reducing the size of the hard disc driving unit having the MR heads.

In addition, with the above-described magnetic reluctance effect magnetic head of the present invention, since the distance g2 is not more than thrice the gap length g1 of the magnetic gap G, the distribution of the bias magnetic field in the magnetic reluctance effect element is changed such that the position of saturation of the bias magnetic field is similarly moved away from an area of optimum sensitivity of the magnetic reluctance element and hence the same effects as described above may be achieved.

Also, in an area of the upper magnetic pole and the magnetic reluctance effect element in which the upper magnetic pole and the magnetic reluctance effect element face each other with the distance g2, the upper magnetic pole is formed so as to be progressively spaced apart from the magnetic reluctance effect element by being inclined with an angle of not more than 30°, and the distance g2 is increased progressively. Thus the effect as described above may again be reached and the playback output may be improved further.

Furthermore, with the above-described magnetic reluctance effect magnetic head according to the present invention, since the magnetic reluctance element and the upper magnetic pole are electrically interconnected by the forward side electrode, the number of terminals provided in the head may be diminished. Besides, static charges occasionally intruded into the magnetic head are intruded into the upper magnetic pole without destructing the magnetic reluctance element.

DETAILED DESCRIPTION OF THE INVENTION

With the magnetic reluctance effect magnetic head according to the present invention, a forward side electrode is stacked on at least the surface of the magnetic reluctance effect element facing a magnetic recording medium, and an upper magnetic pole is stacked on the forward side electrode for facing the magnetic reluctance effect element. A connecting length L1 between the magnetic reluctance effect element and the forward side electrode is shorter than a facing length L2 over which the upper magnetic pole and the magnetic reluctance effect element face each other via a magnetic gap G. In this manner, the magnetic reluctance effect derived from the highly sensitive area of the magnetic reluctance effect element may be achieved and an optimum bias magnetic field may be realized with the low bias current.

With the magnetic reluctance effect magnetic head according to the present invention, the upper magnetic pole and the magnetic reluctance effect element have an area in which the upper magnetic pole and the magnetic reluctance effect element face each other over a distance g2 larger than a magnetic gap length g1 of the magnetic gap G.

With the magnetic reluctance effect magnetic head according to the present invention, a facing length L3 over which the upper magnetic pole and the magnetic reluctance effect element face each other with a distance g2 larger than the gap length g1 of the magnetic gap G is set to 1 $\mu m \leq L3 \leq 5$ $\mu m$. If the facing length is less than 1 $\mu m$, the dependency on the facing length L2 of the bias current as required for forming the optimum bias magnetic field is increased, with the result that the bias current is caused to differ with the minute difference in the facing length L2.

With the magnetic reluctance effect magnetic head according to the present invention, the distance g2 is not more than thrice the gap length g1 of the magnetic gap G. If the distance g2 is more than thrice the gap length, the dependency on the facing length L2 of the bias current as required for forming the optimum bias magnetic field is further increased, with the result that the bias current is caused to differ with the minute difference in the facing length L2.

With the magnetic reluctance effect magnetic head according to the present invention, the upper magnetic pole is formed, in the area in which the upper magnetic pole and the magnetic reluctance effect element face each other with the distance g2, so as to be progressively spaced apart from the magnetic reluctance effect element by being inclined with an angle of not more than 30°, and the distance g2 is increased progressively. If the upper magnetic pole is formed at an angle larger than 30°, the dependency on the facing length L2 of the bias current as required for forming the optimum bias magnetic field is again increased, with the result that the bias current is caused to differ with the minute difference in the facing length L2.

With the magnetic reluctance effect magnetic head according to the present invention, the upper magnetic pole and the magnetic reluctance effect element are electrically interconnected via the forward side electrode.

EMBODIMENTS

Referring to the drawings, preferred embodiments of the present invention will be explained in detail.

With an MR head having a conventional structure, analyses were made into the relation between the connecting length L1 of an MR element with a forward side electrode and the playback output, the relation between a facing length L2 over which the upper magnetic pole and the MR element face each other with a magnetic gap G in-between and the bias current as required to produce an optimum bias magnetic field, and into the distribution of the bias magnetic field in the MR element.

First, the relation between the connecting length L1 of an MR element with a forward side electrode and the playback output was checked. That is, the playback output was measured for various values of the connecting length between the MR element and the forward side electrode for the same MR head. From the results shown in FIG. 2, it may be seen that the smaller the connecting length L1, the more significantly the playback output is improved. This is possibly ascribable to the fact that, since the MR element is disposed at right angles to the medium facing surface in the MR head, the amount of the signal magnetic flux flowing into the MR element is increased and the sensitivity of the MR element is higher in a direction along its length of approaching the medium facing surface of the MR element. That is, the connecting length L1 which is as short as possible is desired for improving the playback output. However, if the amount of the signal magnetic flux flowing into the MR element is taken into account, the connecting length L1 of 1±0.5 $\mu m$ is preferred.

Figure 4:
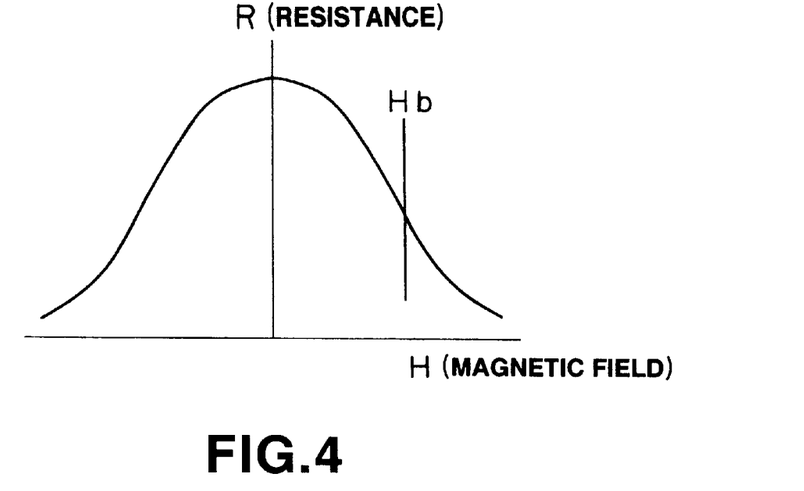
FIG. 4 is a graph showing magnetic reluctance effect characteristics of the MR element.
Figure 5:
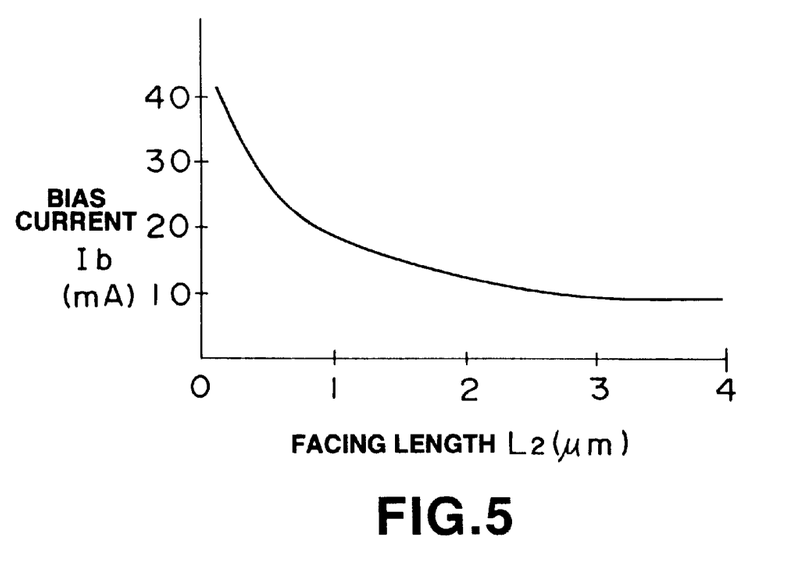
FIG. 5 is a graph showing the relation between the facing length L2 and the bias current Ib.

Second, the relation between the facing length L2 over which the upper magnetic pole in the above-described MR head and the MR element face each other with the magnetic gap G therebetween and the bias current required to produce an optimum bias magnetic field was checked. The optimum bias magnetic field means such bias magnetic field Hb which renders it possible to utilize the MR element within a linear region of the magnetic reluctance effect characteristic curve shown in FIG. 4. That is, with the same MR head, the facing length L2 was changed, and measurements were made of the bias current Ib as required for producing the optimum bias magnetic field Hb for the various values of the facing length L2. From the results shown in FIG. 5, it may be seen that, the shorter the facing length L2, the larger becomes the bias current Ib necessary to obtain the optimum bias magnetic field Hb. It has been shown that, for the facing length L2 not less than 1 $\mu m$, the bias current Ib is not changed significantly. That is, in order to suppress the bias current Ib to a smaller value, reduce the power consumption and the dependency of the bias current Ib on the facing length L2, and to use the bias current terminals for the MR heads in common to reduce the size of the MR head, the facing length L2 needs to be of a certain longer length. In addition, for reducing the bias current Ib, the facing length L2 is preferably 2 $\mu m$ or longer.

However, with the conventional MR head, the connecting length L1 of the MR element to the forward side electrode is selected to be equal to the facing length over which the upper magnetic pole and the MR element face each other with the magnetic gap G therebetween, so that it is difficult to improve playback characteristics and to reduce the power consumption and the size of the MR head.

Figures 2, 3:
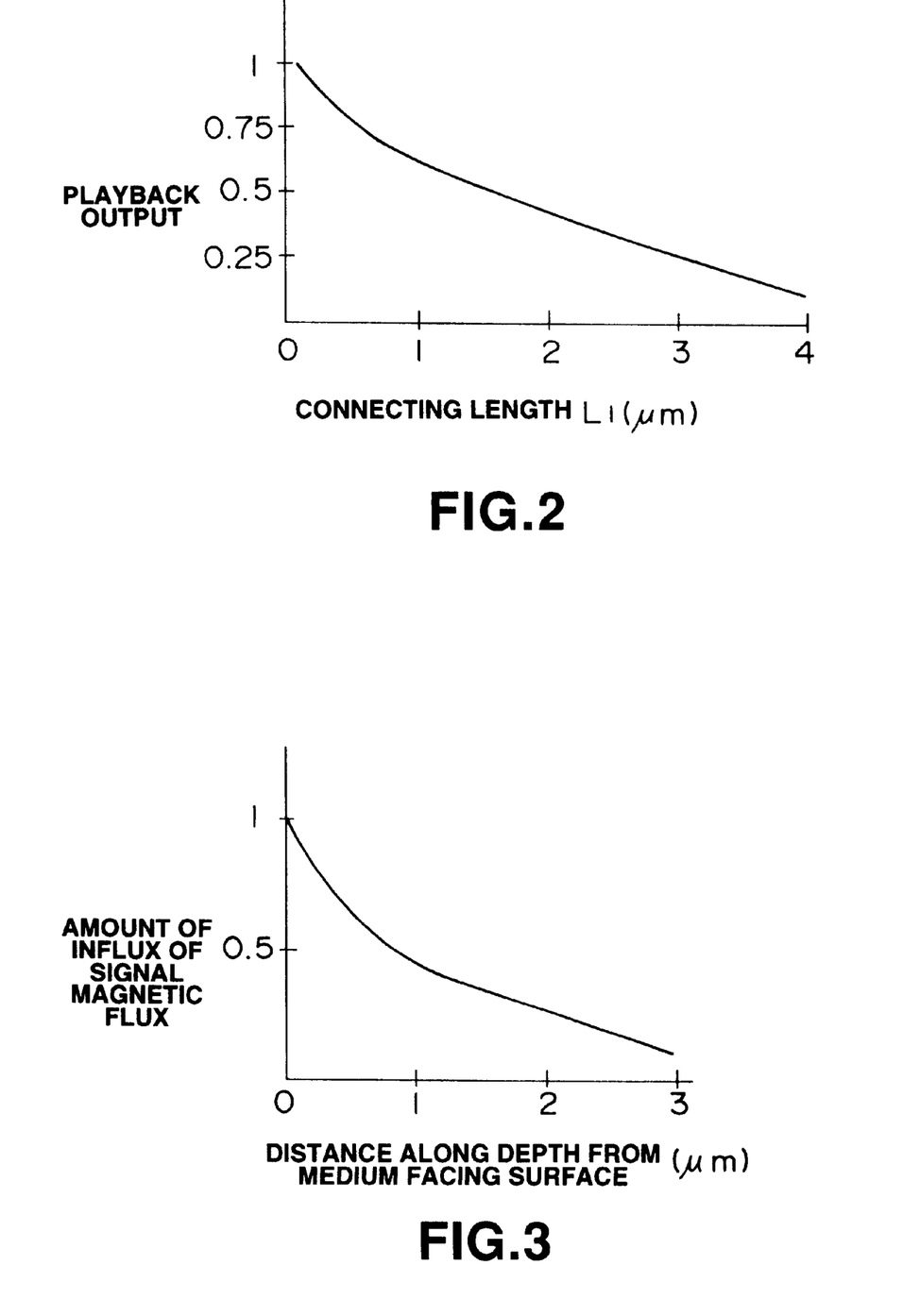
FIG. 2 is a graph showing the relation between the connecting length L1 and the playback output.
FIG. 3 is a graph showing the distribution of the amount of the signal magnetic flux flowing into the MR element.
Figure 6:
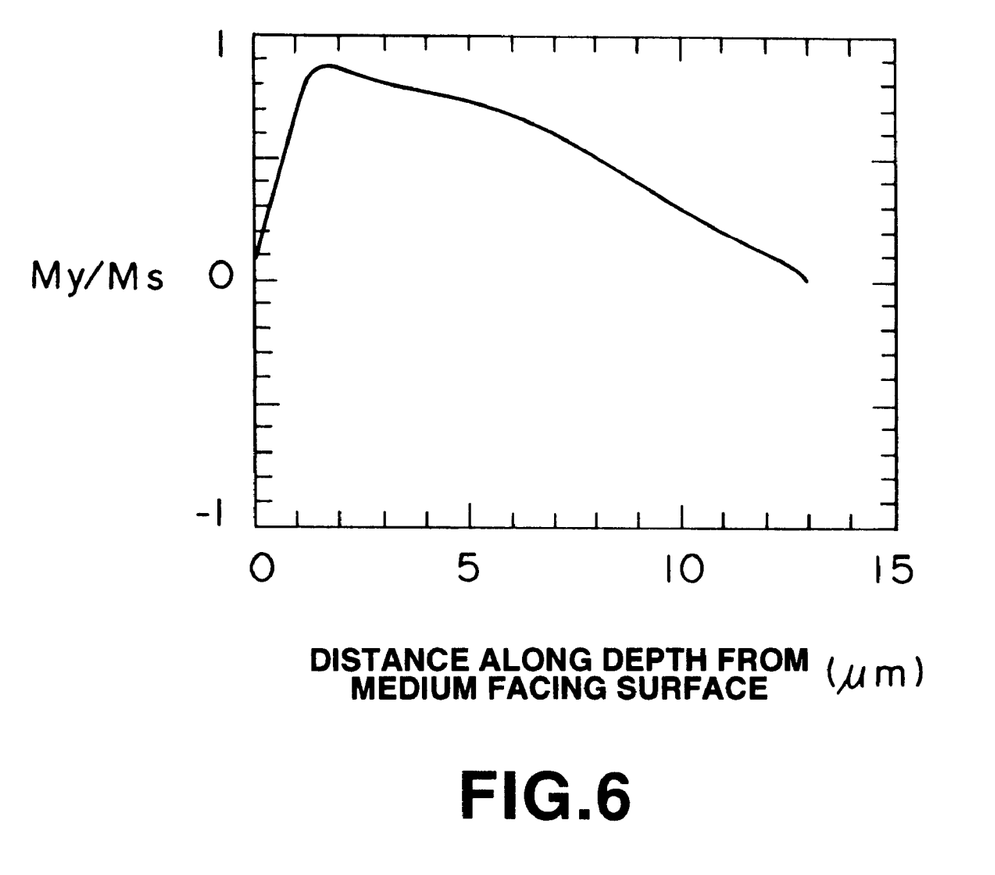
FIG. 6 is a graph showing the distribution of the bias magnetic field in the MR element.

Third, the distribution of the bias magnetic field in the MR element in the above-described MR head was checked. To this end, the ratio of the component of magnetization along the direction of the signal magnetic field My to the saturation magnetization Ms of the MR element was checked. If the direction of magnetization of the MR element has a pre-set angle 45°, the ratio My/Ms becomes equal to 0.71 (My/Ms= 0.71). The results are shown in FIG. 6, from which it is seen that saturation occurs towards the medium facing surface of the MR element. If the results of FIG. 3 are also taken into account, saturation of the bias magnetic field is produced in an area of the MR element having a larger amount of inflow of the signal magnetic flux. This presumably causes the sensitivity of the MR element and the playback output to be lowered. The MR head of the present embodiment overcomes the above-mentioned drawback, that is, enables the playback output to be improved and the optimum bias magnetic field to be obtained by the small bias current, lowers the dependency of the bias current Ib on the facing length L2 and accommodates for reduction in the power consumption and the size of the MR head.

Figure 7:
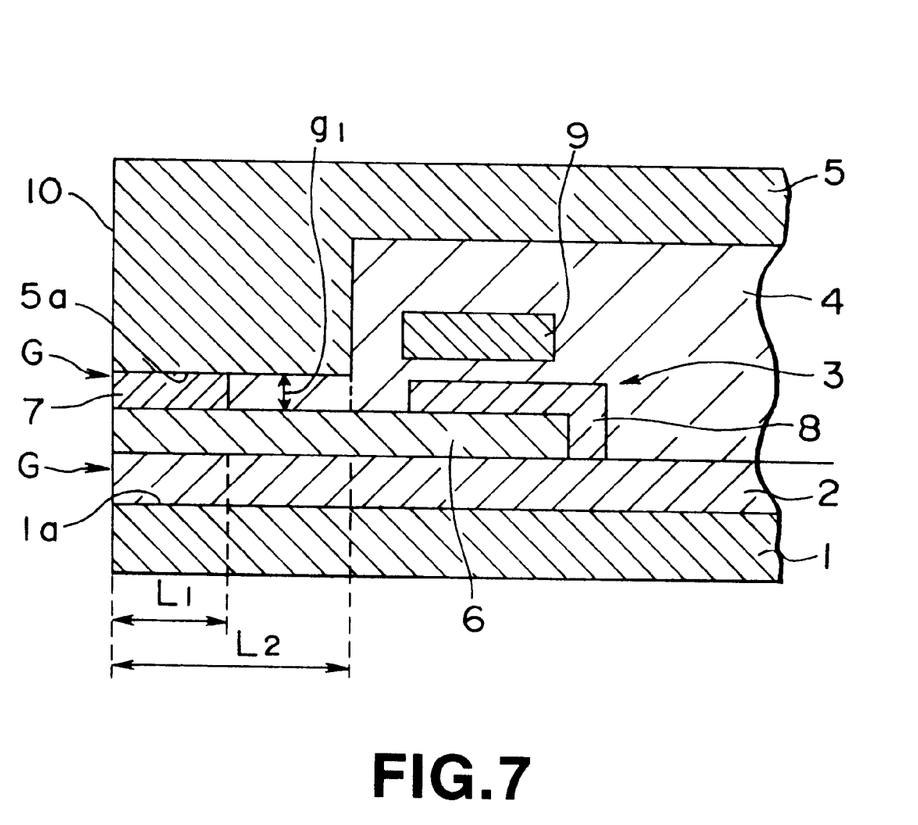
FIG. 7 is a cross-sectional view showing a first embodiment of an MR head according to the present invention.

An MR head according to the first embodiment is arranged and constructed as shown in FIG. 7, in which a magnetic sensitive area 3 is formed on a lower magnetic pole 1 via a first insulating film 2, and an upper magnetic pole 5 is formed thereon via a second insulating film 4. The magnetic sensitive area 3 is made up of an MR element 6, having a forward side electrode 7 towards a surface 10 facing a magnetic recording medium and a rear side electrode 8 on the opposite side, and a bias conductor 9 provided traversing the MR element 6 at right angles thereto for affording a bias magnetic field to the MR element 6 in a pre-set direction. A second insulating film 4 is interposed between the MR element 6 and the bias conductor 9.

The upper magnetic pole 5 has a thickened portion in the vicinity of a surface 10 facing the magnetic recording medium so that the distance between the upper magnetic pole 5 and the lower magnetic pole 1 is diminished towards the surface 10 facing the magnetic recording medium. A terminal end portion 5a of the upper magnetic pole 5 and a terminal end portion 1a of the lower magnetic pole 1 face the MR element 6 via magnetic gap areas G each having a certain gap width. An area of the terminal end portion 5a of the upper magnetic pole 5 is connected to the forward side electrode 7 and the upper magnetic pole 5 is so formed that the facing length L2 over which the terminal end portion 5a of the upper magnetic pole 5 faces the MR element 6 via the magnetic gap area G having a gap length g1 is longer than the connecting length L1 between the MR element 6 and the forward side electrode 7.

In the present MR head, the connecting length L1 between the MR element 6 and the forward side electrode 7 is selected to be shorter than heretofore, so that an area of higher sensitivity of the MR element may be employed. On the other hand, since the facing length L2 by which the terminal end portion 5a of the upper magnetic pole 5 faces the MR element 6 via the magnetic gap G having the gap length g1 is selected to be longer than heretofore, the bias current required to produce an optimum bias magnetic field may be reduced.

Thus it becomes possible with the MR head of the present embodiment to increase the playback output to produce the optimum bias magnetic field with the small bias current.

Figure 8:
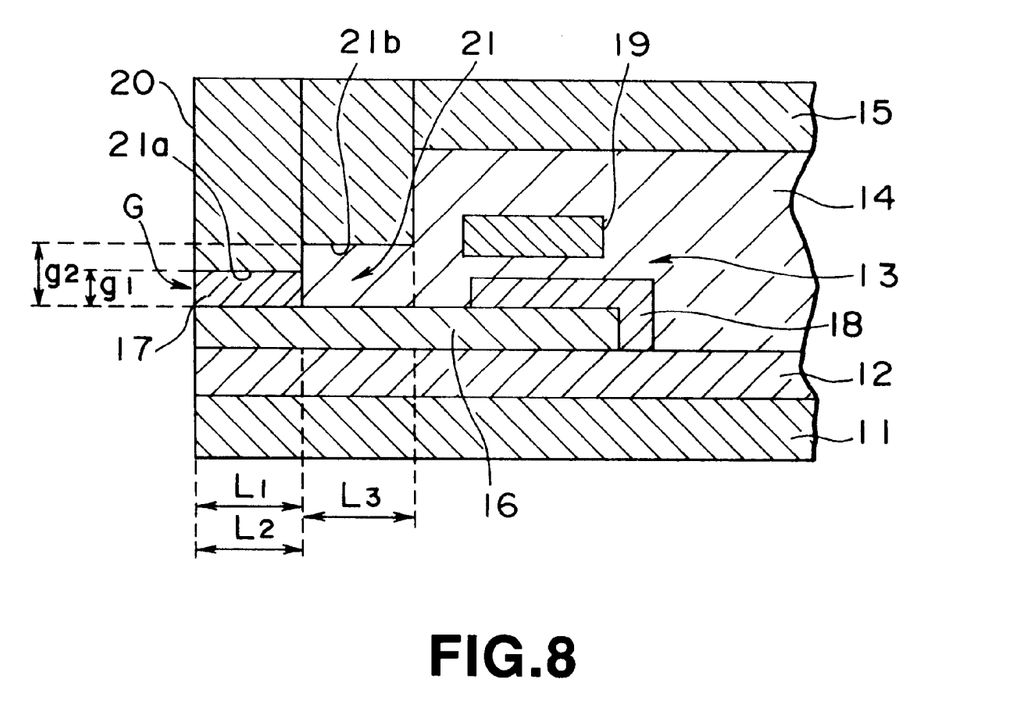
FIG. 8 is a cross-sectional view showing a second embodiment of an MR head according to the present invention.

The second embodiment of the MR head is shown in FIG. 8. With the present MR head, similarly to the previous embodiment, a magnetic sensitive area 13 is formed on a lower magnetic pole 11 via a first insulating film 12, and an upper magnetic pole 15 is formed thereon via a second insulating film 14. The magnetic sensitive area 13 is made up of an MR element 16 having a forward side electrode 17 towards a medium facing surface 20 and a rear electrode 18 on the opposite side, and a bias conductor 19 provided at right angles to the MR element 16 for affording a pre-set direction of magnetization to the MR element 16. The second insulating 14 is also interposed between the MR element 16 and the bias conductor 19.

The upper magnetic pole 15 is thickened in the vicinity of the medium facing surface 20 so that the distance between the upper magnetic pole 15 and the lower magnetic pole 11 is decreased on the side of the medium facing surface 20. The foremost part of the upper magnetic pole 15 has a shoulder 21 consisting of an upper shoulder 21a and a lower shoulder 21b. The upper shoulder 21a faces the MR element 16 via the gap G having a gap length g1, while the lower shoulder 21b has a length g2 longer than the gap length g1 and faces the MR element 16 via a facing length L3. The upper shoulder 21a of the shoulder 21 of the upper magnetic pole 15 is connected to the forward side electrode 17 and the connecting length L1 between the MR element 16 and the forward side electrode 17 is selected to be equal to the facing length L2 over which the upper shoulder 21a of the upper magnetic pole 15 faces the MR element 16 via the magnetic gap G having the gap length g1. It is noted that the distance g2 is not more than thrice the gap length g1, and a facing length L3, via which the lower shoulder 21b of the upper magnetic pole 15 faces the MR element 16 with the length g2, is set to $1\ \mu m \leq L3 \leq 5\ \mu m$.

With the MR head of the present embodiment, the effects similar to those obtained with the MR head of the previous embodiment may be achieved, that is, the playback output may be improved and an optimum bias magnetic field may be obtained with the small bias current. Besides, with the MR head of the present embodiment, since there is a region in which the upper magnetic pole faces the MR element over the distance g2 which is larger than the gap length g1, and the facing length L3 is set to $1\ \mu m \leq L3 \leq 5\ \mu m$, the facing length between the upper magnetic pole and the MR element is deemed to be the sum of L2 and L3. Consequently, the distribution of the bias magnetic field in the MR element is changed in such a manner that the bias magnetic field in the MR element is saturated at a position offset in a direction opposite to the medium facing surface from a region of the MR element in which a large quantity of the magnetic flux is introduced, thus further improving the playback output. Also the dependency of the bias current required for producing the optimum bias magnetic field on the facing length L2 may be lowered, with the result that the terminals for the bias current required for the MR heads may be used in common for reducing the size of the hard disc driving device.

Figure 9:
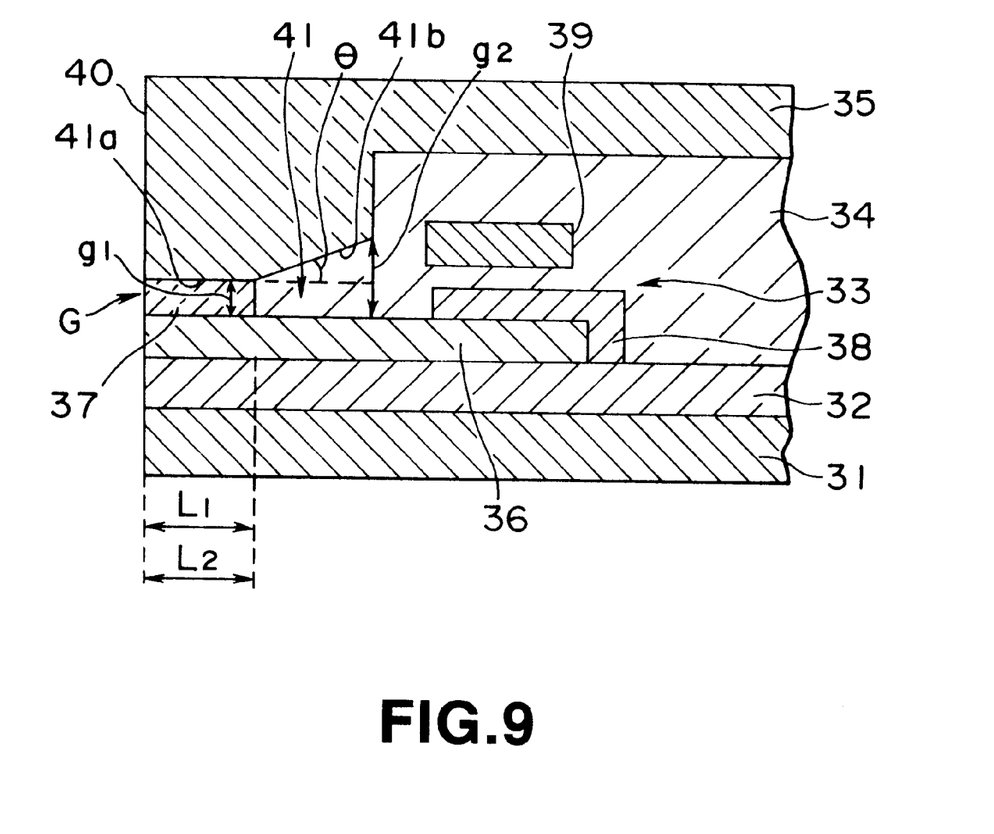
FIG. 9 is a cross-sectional view showing a third embodiment of an MR head according to the present invention.
Figure 10:
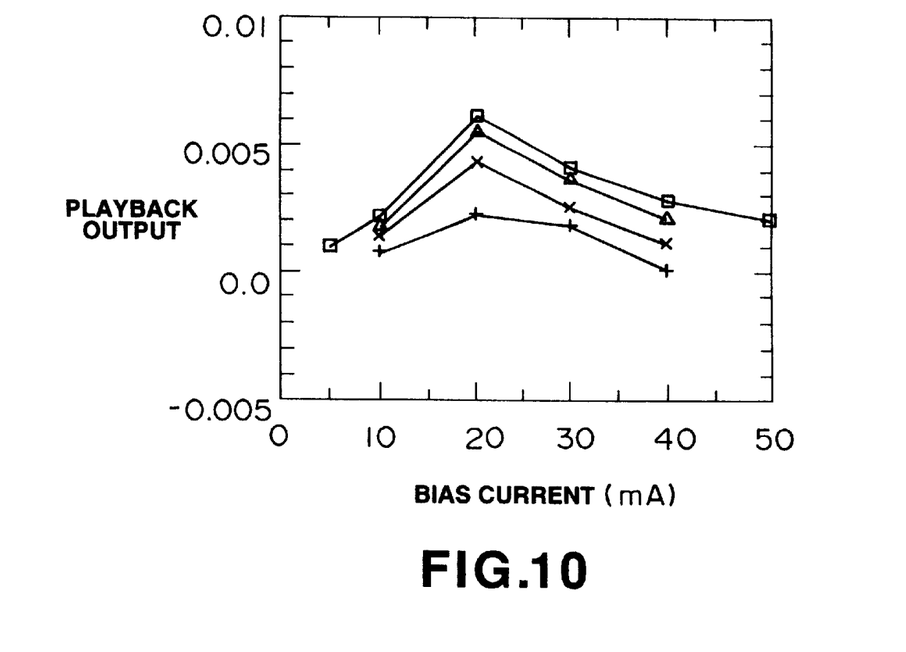
FIG. 10 is a graph showing changes in the playback output with respect to the bias current for a sample 1 MR head.
Figure 11:
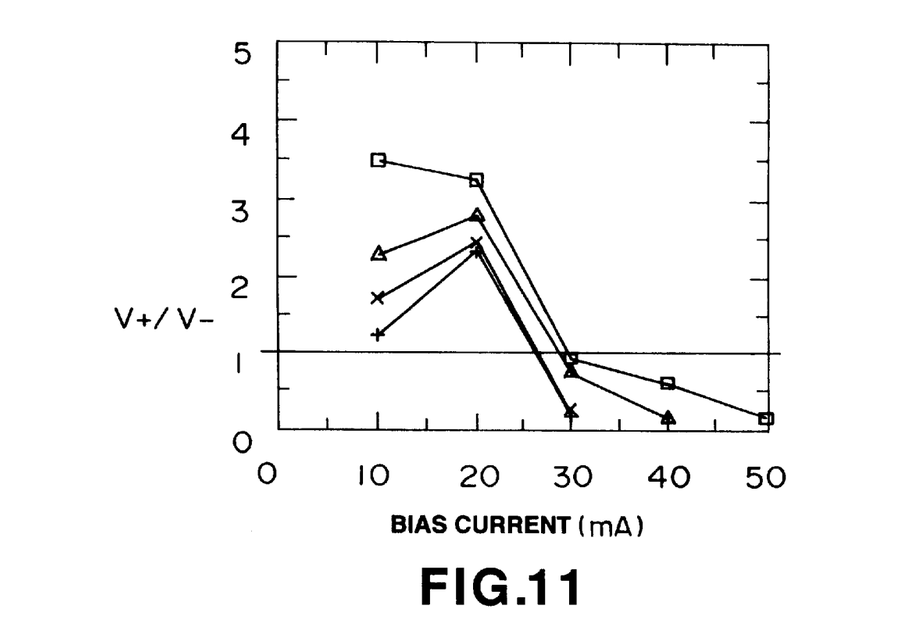
FIG. 11 is a graph showing changes in the symmetry of the playback waveform with respect to the bias current for the sample 1 MR head.
Figure 12:
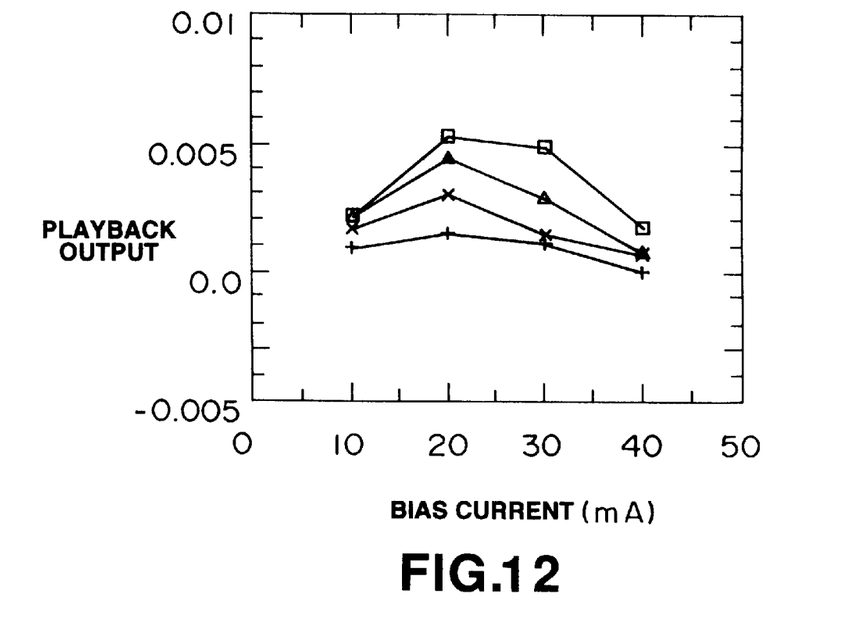
FIG. 12 is a graph showing changes in the playback output with respect to the bias current for a comparative sample 1 MR head.
Figure 13:
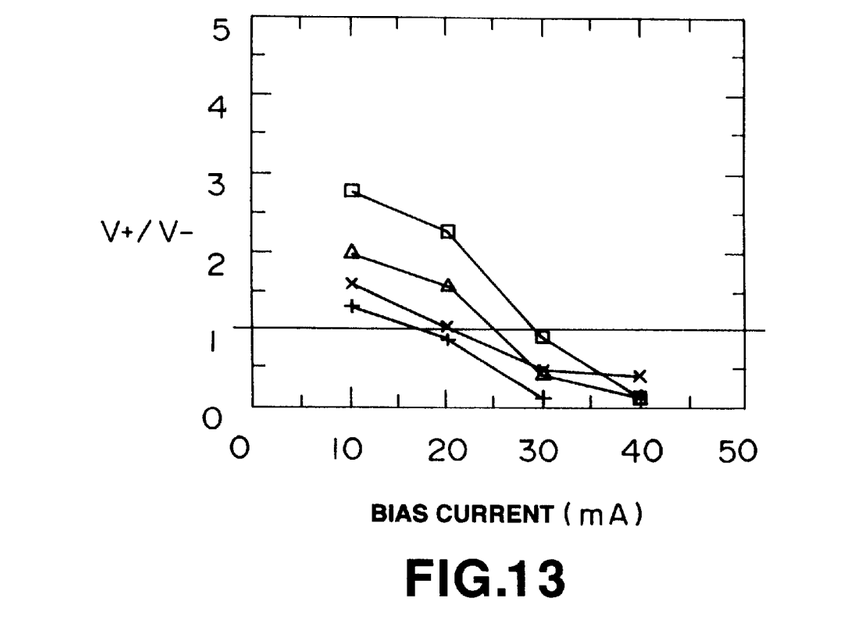
FIG. 13 is a graph showing changes in the symmetry of the playback waveform with respect to the bias current for the comparative sample 1 MR head.

The third embodiment of the MR head is shown in FIG. 9. With the present MR head, similarly to the previous embodiment, a magnetic sensitive area 33 is formed on a lower magnetic pole 31 via a first insulating film 32, and an upper magnetic pole 35 is formed thereon via a second insulating film 12. The magnetic sensitive area 33 is made up of an MR element 36 having a forward side electrode 37 towards a medium facing surface 40 and a rear electrode 38 on the opposite side, and a bias conductor 39 provided at right angles to the MR element 36 for affording a pre-set direction of magnetization to the MR element 36. The second insulating 34 is also interposed between the MR element 36 and the bias conductor 39.

The upper magnetic pole 35 is thickened in the vicinity of the medium facing surface 40 so that the distance between the upper magnetic pole 35 and the lower magnetic pole 31 is decreased on the side of the medium facing surface 40. The upper magnetic pole 35 has a foremost part 41 comprised of a planar portion 41a and an inclined portion 41b, with the planar portion 41a facing the MR element 36 via a magnetic gap G having a gap length g1 and the inclined portion 41b being at an angle Θ relative to the planar portion 41a, with the distance g2 larger than the gap g1 being increased progressively. The planar portion 41a of the foremost part of the upper magnetic pole 35 is connected to the forward side electrode 37. The connecting length L1 between the MR element 36 and the forward side electrode 37 is selected to be the facing length L2 over which the planar portion 41a of the upper magnetic pole 35 faces the MR element 36 via the magnetic gap G having the gap length g1.

With the MR head of the present embodiment, the effects similar to those obtained with the MR head of the previous embodiment may be achieved, that is, the playback output may be improved and an optimum bias magnetic field may be produced with the small bias current. Also, with the MR head of the present embodiment, the upper magnetic pole is adapted to be increasingly spaced away from the MR element in a region thereof facing the MR element over the distance g2, by being inclined at an angle of not more than 30°, so that the facing area between the upper magnetic pole and the MR element is comprised of a facing region with the distance g1 and a facing region with the distance g2.

Consequently, the distribution of the bias magnetic field in the MR element is changed in such a manner that the bias magnetic field in the MR element is saturated at a position offset in a direction opposite to the medium facing surface from a region of the MR element in which a large quantity of the magnetic flux is introduced, thus further improving the playback output. Also the dependency of the bias current required for producing the optimum bias magnetic field on the facing length L2 may be lowered, with the result that the terminals for the bias current as required for the MR heads may be used in common for reducing the size of the MR head.

The effect which the relation between the distance g2 and the gap length g1 in the MR head of the second embodiment has on the characteristics of the MR head was analyzed. Thus an MR head sample 1 with g2=2g1, an MR head sample 2 with g2=3g1 and a comparative MR head sample 1 with g2=4g1 were provided and, of the MR head sample 1 and the comparative MR head sample 1, changes in the playback output and in the playback output symmetry caused with changes in the bias current were analyzed. At this time, the facing length L2, over which the upper magnetic pole faces the MR element via the magnetic gap G having the gap length g1, was also changed in conducting the above analyses. The facing length L2 is equal to the connecting length L1 between the MR element and the forward side electrode. The symmetry in the playback waveform was represented by the ratio of the positive voltage to the negative voltage ($V_+/V_-$). FIGS. 10, 11, 12 and 13 show changes in the playback output of the MR head sample 1, changes in the symmetry in the playback waveform of the MR head sample 1, changes in the playback output of the comparative MR head sample 1 and changes in the symmetry in the playback waveform of the comparative MR head sample 1, respectively. In these figures, □, Δ, × and + indicate the results for L2=0.5 μm, L2=1.0 μm, L2=2.0 μm and L2=4.0 μm, respectively.

Figure 14:
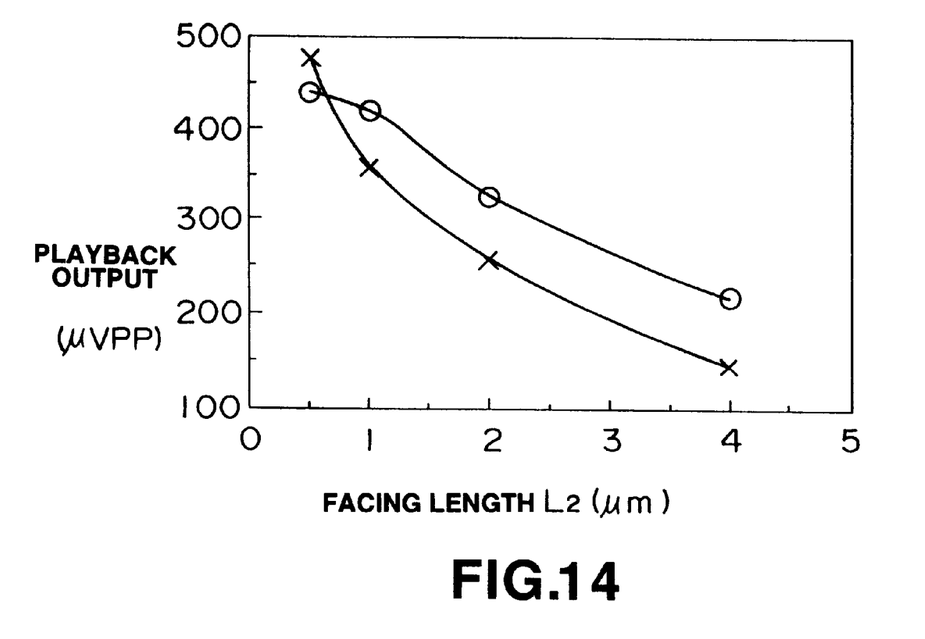
FIG. 14 is a graph showing changes in the playback outputs of the sample 1 MR head and the comparative sample 1 MR head with respect to the facing length L2.

It is seen from the results of FIGS. 10 to 13 that the MR head sample 1 shows that the magnitude of the bias current required in producing the optimum bias magnetic field depends on the facing length L2 to a lesser extent. FIG. 14 shows changes in the playback outputs of the MR head sample 1 and the comparative MR head sample 1, with the facing length L2 as a parameter. In FIG. 14, ○ and × indicate the results for the MR head sample 1 and the comparative MR head sample 1, respectively. With the MR head sample 1, the playback output dependency on the facing length L2 is less than that with the comparative MR head sample 1, such that a playback output higher than that with the conventional MR head may be realized in a region having a larger value of the facing length L2.

Figure 15:
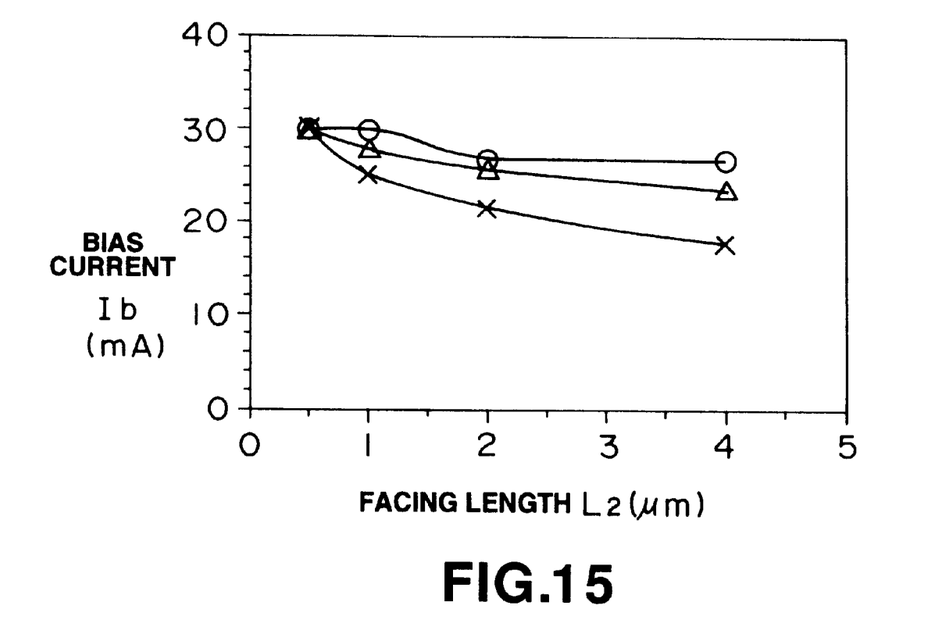
FIG. 15 is a graph showing changes in the bias current Ib with respect to the facing length L2 of the sample 1 MR head, sample 2 MR head and the comparative sample 1 MR head with respect to the facing length L2.

Similar measurements were made of the MR head sample 2. In FIG. 15, changes in the magnitude of the bias current Ib, which will give an optimum bias magnetic field for each of the MR head samples 1 and 2 and the comparative MR head sample 1, are shown with the facing length L2 as a parameter. In FIG. 15, ○, Δ and × indicate the results for the MR head samples 1 and 2 and the comparative MR head sample 1, respectively. It is seen from the results of FIG. 15 that the bias current as required is not changed significantly by the facing length L2 with the MR head samples 1 and 2 with g2≦3g1. Thus it has been confirmed that, if g2≦3g1 with the MR head of the second embodiment, the bias current Ib for each MR head may be rendered substantially constant even although the facing length L2 differs from one MR head to another. Consequently, when the MR head is built in a hard disc driving device, the number of terminals in use may be diminished in order to cope with reduction in size of the device.

Figure 16:
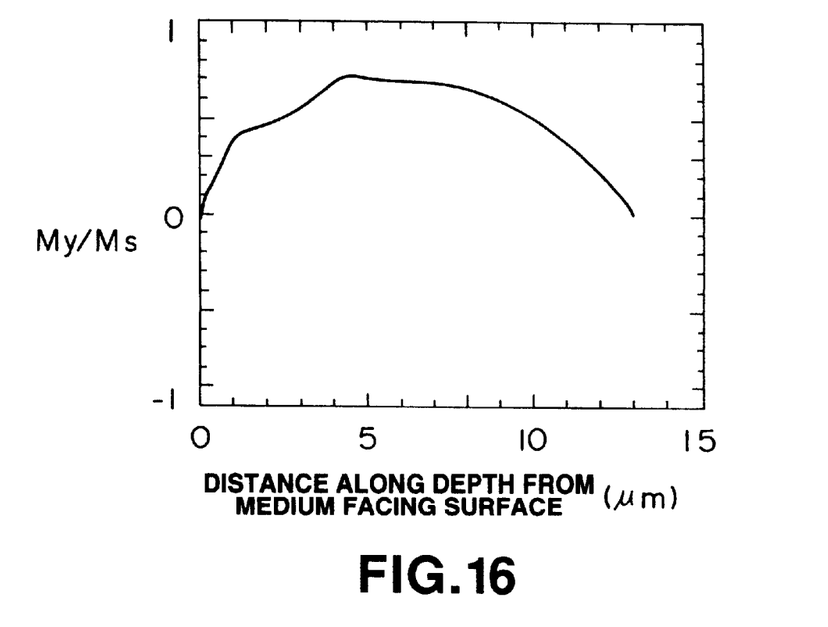
FIG. 16 is a graph showing the distribution of the bias magnetic field in the MR element of the sample 1 MR head.

The distribution of the bias magnetic field in the MR element with the MR head sample 1 with g2=2g1 was also analyzed, and the results shown in FIG. 16 were obtained. It was found that, since the facing length between the upper magnetic pole and the MR element is deemed to be the sum of L2 and L3, the bias magnetic field in the MR element is saturated at a position offset in a direction opposite to the medium facing surface from a region of the MR element in which a large quantity of the magnetic flux flows into the MR element, thus further improving the playback output.

Figure 17:
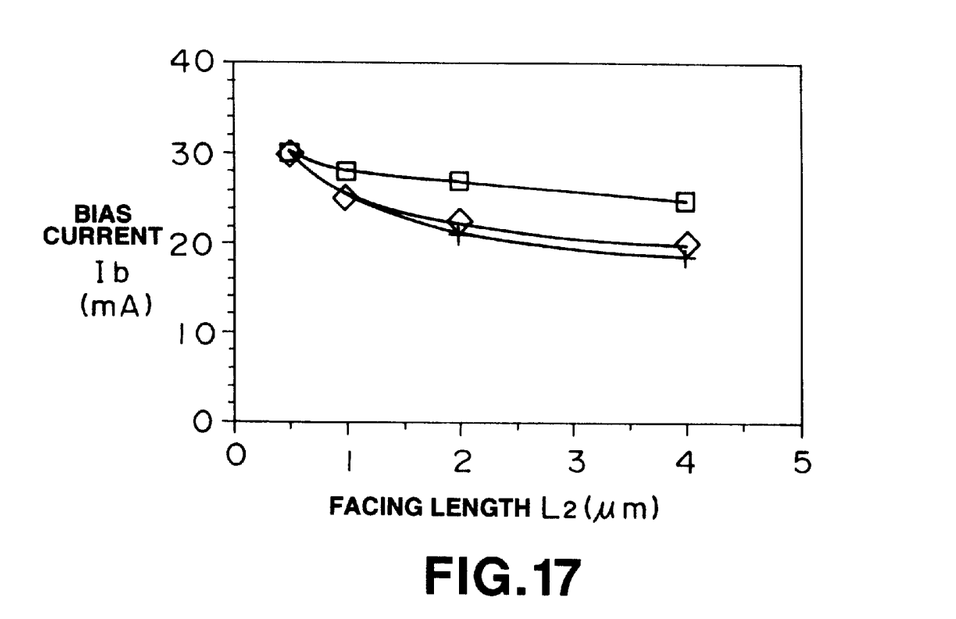
FIG. 17 is a graph showing changes in the bias current Ib with respect to the facing length L2 of a sample 3 MR head, a sample 4 MR head and a comparative sample 2 MR head with respect to the facing length L2.

The effect of the angle Θ of the third embodiment on the characteristics of the MR head was also analyzed. Thus an MR head sample 3 with Θ=15°, an MR head sample 4 with Θ=30° and a comparative MR head sample 2 with Θ=45° were provided. For each of these samples, the facing length L2 over which the upper magnetic pole faces the MR element via the magnetic gap G having the gap length g1 was changed and the bias current Ib required for producing an optimum magnetic field was measured for each value of the facing length. The facing length L2 is equal to the connecting length L1 between the MR element and the forward side electrode. The results are shown in FIG. 17, wherein □, ◇ and + indicate the results for the MR head sample 3, MR head sample 4 and the comparative MR head sample 2, respectively. It is seen from the results of FIG. 17 that the bias current Ib is not substantially changed with the facing length L2 in the MR head samples 3 and 4 with Θ≦30°. Consequently, by setting Θ≦30° in the MR head of the third embodiment, the bias current Ib of each MR head may be substantially constant even although the facing length L2 differs from one MR head to another. Therefore, when the MR head is built in a hard disc driving device, the number of terminals in use may be diminished in order to cope with reduction in size of the MR head.

What is claimed is:

1. A magnetic reluctance effect magnetic head having a magnetic reluctance effect element in which a forward side electrode is stacked on at least the surface of the magnetic reluctance effect element facing a magnetic recording medium, and in which an upper magnetic pole for conducting a bias magnetic field is stacked on said forward side electrode for facing the magnetic reluctance effect element, wherein the improvement resides in that a connecting length L1 between the magnetic reluctance effect element and the forward side electrode is shorter than a facing length L2 over which the upper magnetic pole and the magnetic reluctance effect element face each other via a magnetic gap G.

2. The magnetic reluctance effect magnetic head as claimed in claim 1 wherein the upper magnetic pole and the magnetic reluctance effect element have an area in which the upper magnetic pole and the magnetic reluctance effect element face each other over a distance g2 larger than a magnetic gap length g1 of the magnetic gap G.

3. The magnetic reluctance effect magnetic head as claimed in claim 2 wherein a facing length L3 over which the upper magnetic pole and the magnetic reluctance effect element face each other with the distance g2 larger than the gap length g1 of the magnetic gap G is set to 1 μm≦L3≦5 μm.

4. The magnetic reluctance effect magnetic head as claimed in claim 2 wherein the distance g2 is not more than thrice the gap length g1 of the magnetic gap G.

5. The magnetic reluctance effect magnetic head as claimed in claim 2 wherein, in the area in which the upper magnetic pole and the magnetic reluctance effect element face each other with the distance g2, the upper magnetic pole is formed so as to be progressively spaced apart from the magnetic reluctance effect element by being inclined with an angle of not more than 30°, and wherein the distance g2 is increased progressively.

6. The magnetic reluctance effect magnetic head as claimed in claim 1 wherein the upper magnetic pole and the magnetic reluctance effect element are electrically interconnected via the forward side electrode.

* * * * *